United States Patent
Congdon et al.

(10) Patent No.: US 7,429,990 B2
(45) Date of Patent: *Sep. 30, 2008

(54) NETWORK MANAGEMENT CARD FOR USE IN A SYSTEM FOR SCREEN IMAGE CAPTURING

(75) Inventors: Bradford B. Congdon, Olympia, WA (US); Rama U. Reddy, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 437 days.

This patent is subject to a terminal disclaimer.

(21) Appl. No.: 10/369,727

(22) Filed: Feb. 21, 2003

(65) Prior Publication Data

US 2003/0210246 A1    Nov. 13, 2003

Related U.S. Application Data

(63) Continuation of application No. 09/274,913, filed on Mar. 23, 1999, now Pat. No. 6,556,208.

(51) Int. Cl.
*G09G 5/39* (2006.01)
*G09G 5/36* (2006.01)
*G06F 13/00* (2006.01)
*G06F 13/14* (2006.01)

(52) U.S. Cl. .................. 345/520; 345/531; 345/545; 710/107

(58) Field of Classification Search .............. 345/501, 345/102, 520, 530, 531, 545; 710/100, 107, 710/260, 305; 709/200, 208, 213, 217, 223, 709/224
See application file for complete search history.

(56) References Cited

U.S. PATENT DOCUMENTS

| 5,878,248 A * | 3/1999 | Tehranian et al. ........... 345/502 |
| 6,026,218 A * | 2/2000 | Klingelhofer ............... 710/107 |
| 6,098,143 A * | 8/2000 | Humpherys et al. ......... 710/260 |
| 6,476,854 B1 * | 11/2002 | Emerson et al. ............. 348/143 |
| 6,556,208 B1 * | 4/2003 | Congdon et al. ............ 345/520 |

* cited by examiner

*Primary Examiner*—Kee M. Tung
*Assistant Examiner*—Hau H Nguyen
(74) *Attorney, Agent, or Firm*—Kenyon & Kenyon LLP

(57) ABSTRACT

A network management card is provided to capture a screen image of a host system for transmission over a computer network for remote viewing and remote system management. The network management card is provided with a processor which processes a program to implement a video capture sequence of operations; and a bus controller having operations controlled by the processor, which tracks events on a bus of the host system, including operations of a video subsystem of the host system, and which executes a video capture sequence of operations to capture a screen image provided by the video subsystem of the host system for transmission to a remote system over a computer network or other communications link for remote viewing and remote system management.

12 Claims, 6 Drawing Sheets

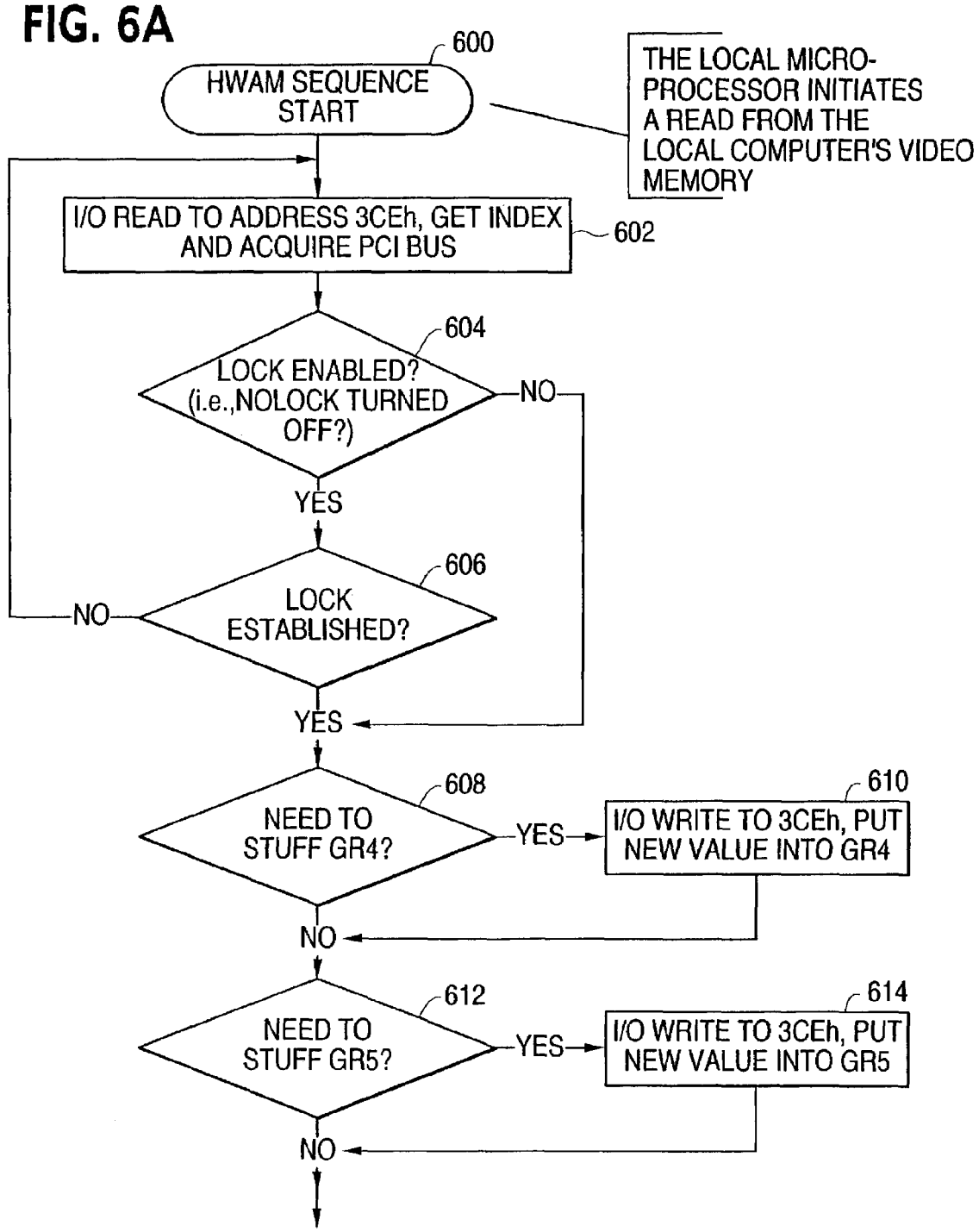

NETWORK MANAGEMENT CARD FOR USE IN A SYSTEM FOR SCREEN IMAGE CAPTURING

CROSS REFERENCE TO RELATED APPLICATION

This is a continuation of U.S. application Ser. No. 09/274,913, filed Mar. 23, 1999 now U.S. Pat. No. 6,556,208, the subject matter of which is incorporated by reference herein.

TECHNICAL FIELD

The present invention relates to a remote image capturing system, and more particularly, relates to a screen image capturing arrangement for use in a system for transmission over a network for remote viewing and remote system management.

BACKGROUND

Computer architectures generally include a plurality of separate devices such as processors, memories, and peripheral devices, interconnected by one or more buses. For example, a host system 100, such as a server, a workstation or a personal computer (PC), as shown in FIG. 1, may include at least a processor 102, a cache (high-speed static random-access-memory, RAM) 104, a bridge/memory controller 106, and a memory (high-speed dynamic RAM) 108. A local bus may provide a link between the processor 102, the cache 104, and the memory (high-speed dynamic RAM) 108. As opposed to the local bus, system buses may be used as an interconnect transportation mechanism to transport data between highly integrated peripheral devices, peripheral add-in boards, and audio and video subsystems. Examples of add-in boards include a standard network adapter 112 for providing an interface to a computer network N or other communications link, a small computer systems interface (SCSI) adapter 114 for supporting a plurality of storage devices 116 such as disk drives, tape drives, and compact disk read-only-memory (CD-ROM). Also included may be an audio subsystem 118 and a video (graphics) subsystem 120 for supporting audio and video presentations via a monitor 122 and speakers (not shown). Examples of system buses for transporting data between the bridge/memory controller 106, the standard network adapter 112, the SCSI adapter 114, the audio subsystem 118 and the video subsystem 120, include a Peripheral Component Interconnect (PCI) bus 110 for high speed applications.

The video subsystem 120 may include a video memory (high-speed dynamic RAM or specialized video RAM) for retaining graphics or character information for display, video registers, and a graphics (video) controller for controlling a visual display of video including animation, full-motion video, still images, and graphics. Some video subsystems 120 for use in a host system may capture individual screen images for presentations and desktop publishing applications. Unfortunately, none of these video subsystems may capture a screen image of a host system for network applications such as, for example, transmission to a remote system over a computer network for purposes of providing remote viewing, system diagnostics and system management. Moreover, neither the video memory nor the graphics controller in a video subsystem for use in a host system may be designed for access by multiple masters. The video subsystem assumes that only a single master (e.g., a host processor) will read and write to video memory to capture a screen image for video redirection from a display monitor, and that no other master will read or write to video memory. Consequently, any attempt to access video memory in a video subsystem for redirection while the host processor accesses such video memory will corrupt the video memory and disturb a screen image of a host system.

One approach to capture a screen image of a host system for transmission to a remote system over a computer network may be to remove the original video subsystem from the host system and incorporate the complete video subsystem including memory and controller into a typical network card. However, there may be two major disadvantages to this approach. The first disadvantage may be the added cost of the standard network card to support the video subsystem. The second disadvantage may be that the host system user is restricted to a particular graphics controller which is offered by a typical network card. Consequently, the host system user may be unable to take advantage of the rapid advances in latest graphics controller performances and capabilities.

SUMMARY

Accordingly, embodiments of the present invention are directed to a screen image capturing arrangement for use in a host system including a video subsystem. The screen image capturing apparatus may be adapted to track operations of a video subsystem of the host system, and to execute a video capture sequence of operations to capture a screen image provided by a video subsystem of the host system for transmission over a communication link.

BRIEF DESCRIPTION OF THE DRAWINGS

A more complete appreciation of exemplary embodiments of the present invention, and many of the attendant advantages of the present invention, will become readily apparent as the same becomes better understood by reference to the following detailed description when considered in conjunction with the accompanying drawings in which like reference symbols indicate the same or similar components, wherein:

FIGS. 6A and 6B illustrate an example operation of a Video Capture Hardware Assist Machine (HWAM) of a PCI bus controller ASIC for capturing a screen image of a host system without causing video corruption according to the principles of the present invention; and FIG. 7 illustrates an example remote system management of a host system from a remote system over a computer network according to the principles of the present invention.

DETAILED DESCRIPTION

The present invention is applicable for use with all types of bus standards including a Peripheral Component Interface (PCI) bus, an Industry Standard Architecture (ISA) bus, an Extended Industry Standard Architecture (EISA) bus, and a Micro-Channel Architecture (MCA) bus, all types of video subsystem industry standards including Monochrome Display Adapter (MDA), Color Graphics Adapter (CGA), Enhanced Graphics Adapter (EGA), Video Graphics Array (VGA), Super-VGA (SVGA), eXtended Graphics Array (XGA), and all video memory and register configurations, including new bus standards and new video subsystem standards which may become available as computer technology develops in the future. However, for simplicity and for purposes of limiting the volume of this disclosure to a manageable/readable size, discussions will concentrate mainly on exemplary use of a PCI bus and a VGA/SVGA compatible video subsystem, although the scope of the present invention is not limited thereto. The PCI bus may be a high performance 32 or 64 bit synchronous bus with automatic configurability and multiplexed address, control and data lines as described in the latest version of "PCI Local Bus Specification, Revision 2.1" set forth by the PCI Special Interest Group (SIG) on Jun. 1, 1995. Currently, the PCI architecture provides the most common method used to extend computer systems for add-on arrangements (e.g., expansion cards) with new video, networking, or disk memory storage capabilities.

Figure 2:
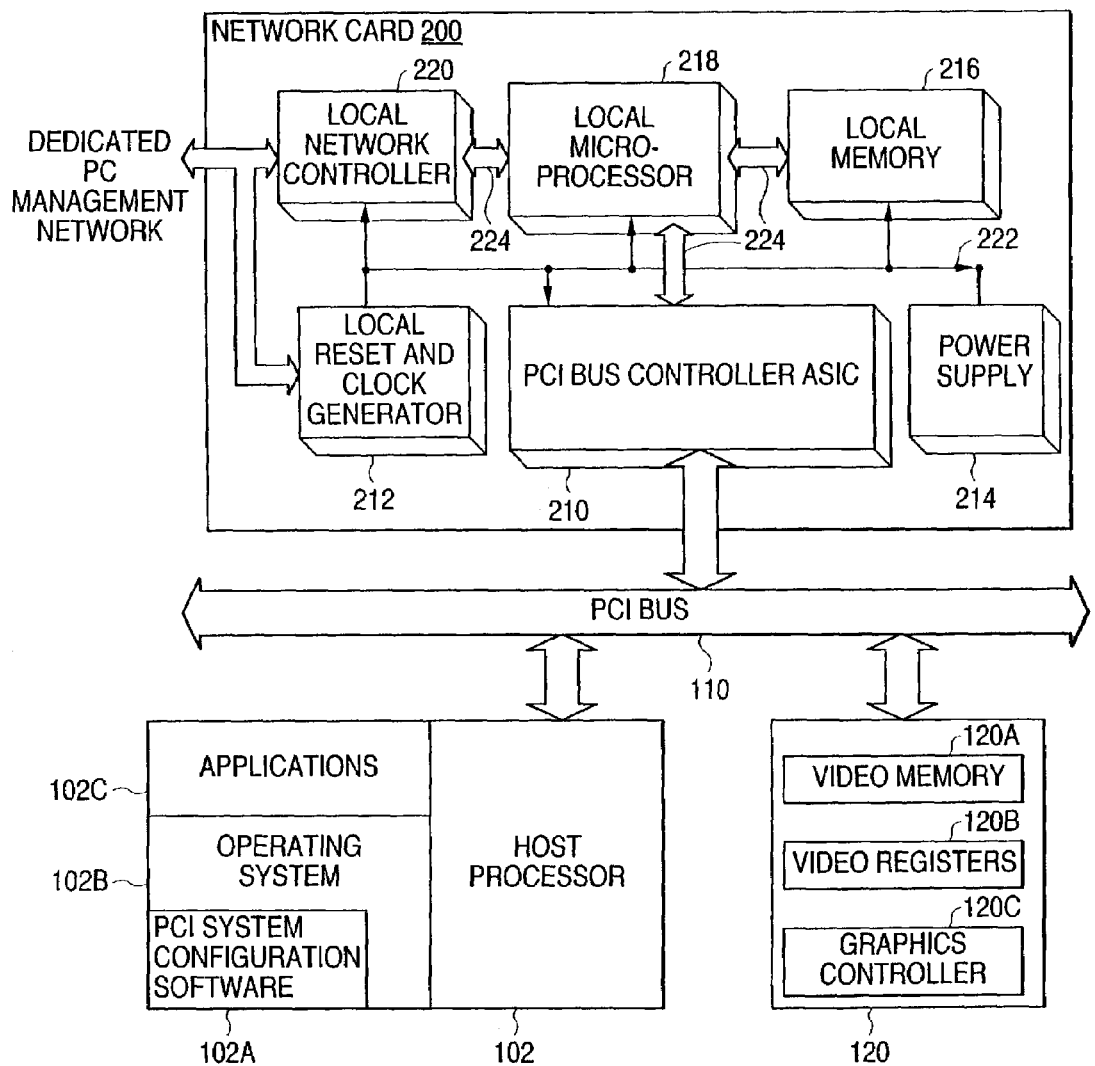
FIG. 2 illustrates an example network management card for use in a host system for capturing a screen image of a host system for transmission over a computer network for remote viewing and remote system management according to the principles of the present invention.

Attention now is directed to the drawings and particularly to FIG. 2, which illustrates an example network management card 200 for use in a host system. Such a network management card 200 may be implemented in a host system to capture a screen image of the host system for transmission over a computer network or other communications link without a built-in, on-card video subsystem and without causing video corruption according to the principles of the present invention. In addition, such a network management card 200 may also be implemented in a host system for purposes of providing system diagnostics and monitoring to assist a remote user (e.g., network administrator) in proactively managing, repairing and enhancing the performance of such a host system over a computer network. Examples of such host and remote systems include personal computers (PCs), workstations, or servers. The network management card 200 may be fully enclosed in a casing of a host system to allow a remote user (e.g., network administrator) on a computer network such as a private management network to monitor the health of a host system on the private management network. In particular, the network management card 200 may allow the remote user to learn about failure conditions of a host system, including important error messages provided on a host system screen during, for example, a boot-up operation so that the remote user may remotely provide system diagnostics including instructions to the host system to reboot, as a way of recovering from certain failures, for example.

The network management card 200 may be both mechanically and electrically PCI-compliant, and a user-friendly, self-contained video capturing device that operates fully in conjunction with a running host system. The network management card 200 may be constructed and/or programmed to observe input/output (I/O) signals passing through a PCI bus 110 of a host system for tracking video mode transitions from text to graphics mode (or vice versa). Such tracking may enable the network management card 200 to access memory locations of a video memory from the PCI bus 110 and to read frame buffer data (i.e., a screen image) displayed on a host system screen from that video memory. Such tracking may also enable the network management card 200 to send a copy of that video memory over a computer network to a remote user, thereby allowing the remote user to view the same screen image as shown on the host system screen.

In addition, the network management card 200 may be designed to provide ease of installation with PCI slots that are prevalent in many host systems. When plugged into a PCI slot (not shown) of a host system, the network management card 200 may evaluate operations of a PCI bus 110 within any user-designated time period or on a continuous basis, including sensing input/output (I/O) signals passing through the PCI bus 110, and particularly, voltage levels on the PCI signal lines to determine whether a host system changes the mode of the video memory from text to graphics mode (or vice versa). The network management card 200 may store a monitoring log/record of a predetermined number of PCI bus operations, or may immediately report the same to a local microprocessor 218, and/or may capture a screen image of a host system in a non or minimally corrupting fashion for transmission to a remote user over a computer network. Depending on the implementation, software running on the network management card 200 may signal remotely to a remote system on a computer network that an event such as a video mode transition of a host system from text to graphics mode (or vice versa) has occurred on the PCI bus 110, and may communicate with a remote user as to the progress of the host system through different video mode transitions during a boot-up or reset operation so as to allow the remote user to view the same screen image as shown in the host system screen. The network management card 200 may be configured as a separate and independent plug-in card, or alternatively, as part of a System Management Module (SMM) card of a host system to provide extra functionality to the host SMM card.

As shown in FIG. 2, the network management card 200 may be a miniature independent processing system that has its own operating system, power supply, local reset and local clock separate and independent from the host system i.e., to allow the network management card 200 to operate independently of the host system, such that the management card's operation can be unaffected by anomalies/failures on the PCI bus 110, and can continue to operate even in the event of total host system crash or failure. Specifically, the network management card 200 may include a PCI bus controller ASIC 210, a local reset and clock generator 212, a power supply 214, a local memory 216, a local microprocessor 218, and a local network controller 220. A local bus 222 may provide the common link between the PCI bus controller 210, the local reset and clock generator 212, the power supply source 214, the local memory 216, the local microprocessor 218, and the local network controller 220. In addition, an address/data/control bus 224 may provide the direct link for communications between the local microprocessor 218 to each of PCI bus controller 210, the local memory 216, and the local network controller 220.

For purposes of completeness, FIG. 2 also shows a host processor 102 and a video subsystem 120 of the host system. The host processor 102 may be one of "Pentium®" families of microprocessors (manufactured by Intel Corp.), although other types of microprocessors may also be used. Such a host processor 102 may also include several software products such as a PCI system configuration software 102A, a host operating system 102B, and one or more application programs 102C. The respective functions of the software are well-known and need not be described in detail herein. The PCI system configuration software 102A is part of what is typically called "BIOS" (Basic Input/Output System) software which performs power-on diagnostics for the host system and provides the various level routines to support system configuration and data input. In one implementation of the present invention, the PCI system configuration functions used may be outlined by the "PCI BIOS Specification, Revision 2.0" as set forth by the PCI Special Interest Group (SIG) in Jul. 20, 1993. Such PCI specification sets forth sufficient information to enable a programmer to design a suitable configuration software module for PCI system configuration software 102A.

The video subsystem 120 may be integrated into a motherboard of a host system, or alternatively, may be configured as a separate and independent add-on video card for supporting video presentations of a host system. The video subsystem 120 may be a Video Graphics Array (VGA) or a Super-VGA (SVGA) compatible video subsystem. Such a video subsystem 120 may include a video memory 120A (high-speed dynamic RAM or specialized video RAM) for retaining graphics or character information for display, video registers 120B, and a graphics (video) controller 120C for controlling a visual display of video as well as other images such as animation, full-motion video, still images, and graphics. The video memory 120A may have memory, for example, 256 Kbytes, 512 Kbytes, 1 Mbytes, 2 Mbytes, 4 Mbytes, 16 Mbytes or 32 Mbytes used to handle data information currently displayed on-screen and to speed screen refresh. Generally, the higher the resolution and color capabilities of the video subsystem 120, the more memory the video subsystem 120 uses. The video registers 120B may contain system latches, graphics (VGA) indexes, a read map select register (GR4) and a mode register (GR5). The VGA and SVGA specifications for video memory and registers in a video subsystem 120 are well-known and, therefore, need not be described in detail herein.

Discussion now turns to the local reset and clock generator 212, and in particular, turns first to the local clock generator. More specifically, the present invention is advantageous in that it includes its own local clock generator which is independent from any global (bus/host) clock signal appearing on the bus or within the host system. Such local clock generator may be a crystal or other arrangement, and may include related circuitry useful in clock generator arrangements. The present invention (and even the entire management card) may operate with such independent local clock generator. This is advantageous in that it allows the present invention to operate independently of the global bus/host clock, such that the present inventions's monitoring, recording and/or reporting (or any other) operations can be unaffected by any global clock anomalies/failures on the bus or host system, and can continue to operate.

As to the frequency of the independent local clock, such clock frequency may be at a same frequency as a global (bus/host) clock. However, a matching frequency may be disadvantageous in a number of regards. First, a phase-locked loop (PLL) circuit or other synchronizing arrangement may be needed to a match local clock frequency and/or phase of the present invention's clock generator to that of the global clock signal. Further, some bus specifications (e.g., the PCI bus specification) allow a bus clock to change frequency during operation, and thus the present invention's clock generator may need likewise to have the ability to change clock frequency. Still further, individual bus clock cycles may be difficult to monitor if phases between the local and global clocks are mismatched a predetermined amount and/or response times (e.g., setup times) of monitoring circuits are incorrect, resulting in an unreliable "metastable" condition. Accordingly, the present invention may also be practiced by having a local clock frequency which is faster than that of the global bus/host clock. More particularly, any predetermined frequency may be selected. For example, with typical PCI bus arrangements operating with a bus clock frequency of up to 33 MHz, the predetermined frequency of at least 40 MHz, e.g., 50 MHz, may be used.

Use of a faster clock frequency is advantageous in a number of regards. First, as the present invention operates at a faster clock frequency, it may complete each local monitoring cycle faster than a bus clock cycle, and thus may always be ready to monitor a next bus clock cycle operation, i.e., slower cycle global bus operations may be captured and converted up in frequency to the present invention's local clock frequency for use within the arrangement of the present invention. Further, as the example 50 MHz frequency is faster than all typical PCI bus arrangements operating with a bus clock frequency of up to 33 MHz, the example 50 MHz embodiment may be generic to all 33 MHz or less bus arrangements. Further, even if a 33 MHz or less bus implementation has a changing clock frequency, there is no need to change a clock frequency of the present invention, as the operations of the present invention are not dependent on the global clock frequency.

The present invention is not limited to the example 50 MHz embodiment, but instead may have a local clock generator having an even faster local clock frequency. For example, while the above discussion mentions typical PCI bus arrangements operating with a bus clock frequency of up to 33 MHz, the PCI bus specification actually allows a PCI bus to operate at a much greater bus clock frequency. Further, other types of bus systems (especially those which may become available in the future as bus technology develops), may also operate at greater bus clock frequencies. The present invention is intended for use with all bus clock frequencies.

Discussion turns next to the local reset. More specifically, the present invention is advantageous in that it includes its own local reset which is independent from any global (bus/host) reset signal appearing on the bus or within the host system. All circuits with respect to the present invention (and even the entire management card) may be immune to any global reset, and instead be reset with such independent local reset. This is advantageous in that it allows the present invention to operate independently of any global reset on the bus or host system, such that the present inventions's monitoring, recording and/or reporting (or any other) operations can be unaffected by any global reset, and can continue to operate. This allows the present invention to monitor, record and or report any global reset anomalies/failures on the bus or host system. The local reset may be triggered through any suitable means, for example, by physical activation of a mechanical switch, by a predetermined specialized reset command sent from the host system through the bus and recognized by the present invention, and a predetermined specialized reset command sent from a remote system through a computer network and recognized by the present invention.

The power supply 214 may be a single battery or a set of batteries or any other type of power storage or generation devices for providing optional power backup. The network management card 200 may be designed to use low-power circuitry to extend the life of these batteries. Despite the batteries, in normal operating conditions, the network management card 200 may use power from a host system. However, when the host system power becomes unreliable or dissipates completely, the power supply 214 may automatically sense the power fault condition and seamlessly take over responsibility for providing power to all the circuitry on the network management card 200 for operation.

The local memory 216 may include Flash BIOS (Basic Input/Output System) chips for holding permanent boot-up code for the local microprocessor 218, DRAM chips for storing an operating system that is independent from a host operating system, and network management software programmed to sense operations on the PCI bus 110, including video mode transitions from a video subsystem 120 of a host system and to capture a screen image provided by the video subsystem 120 for transmission over a computer network to a remote user for remote viewing and remote system management. The flash BIOS chips may be, for example, flash memory product numbers 28F0088C3, 28F016C3, 28F032C3, 28F800C3, 28F160C3, 28F320C3 (manufactured by Intel Corp.)

The local microprocessor 218 may be a low-power 32-bit microprocessor for running an operating system, with network management software from local memory 216 which can read and write to local memory 216 as well as to registers in the system controller 210 and in the local network controller 220. The local microprocessor 218 on the network management card 200 may be, for example, an X86 family of microprocessors (manufactured by Intel Corp.), although other types of microprocessors may also be used.

The local network controller 220 may provide an interface to a private management network, and more particularly, to a dedicated PC management network such as a local area network (LAN) including an Ethernet, Token Ring, Fiber Data Distribution Interface (FDDI) or Asynchronous Transfer Mode (ATM) arrangement. Other examples of such a computer network include a wide area network (WAN), a campus area network (CAN), a metropolitan area network (MAN), a global area network (GAN), and a system area network (SAN). In addition, the local network controller 220 may also include, for example, an integrated modem so that a remote user can talk to the network management card 200 by way of a telephone line, as an alternative to a computer network. Packets of data may be both sent and received through the computer network. Typically, the local microprocessor 218 may send a data packet over this computer network to a remote user when a pre-defined trigger condition has occurred on the network management card 200, such as a video mode transition on the PCI bus 110 sensed by the PCI bus controller 210. This data packet may inform the remote user on the computer network of screen image locations in the video memory 120A of a video subsystem 120. The computer network may also be used by the remote user to send and receive commands and data to/from the local microprocessor 218 within the network management card 200. For example, the remote user may send a command to read a register in the PCI bus controller 210. The local microprocessor 218 may receive this command, read the data from the PCI bus controller 210, and send the same back to the remote user over the computer network.

The PCI bus controller 210 may be fully realized in an ASIC (Application Specific Integrated Circuit), and may include a PCI bus interface, an internal bus interface, state machines (for master and target control), data buffers (for the read and write data to support the bus transfer rate), and PCI configuration registers (which are programmable registers and written by local microprocessor 218 over the local bus 222), as described in accordance with the latest version of "PCI Local Bus Specification, Revision 2.1" by the PCI Special Interest Group (SIG) in Jun. 1, 1995. The PCI configuration registers may also be written and read by the host processor 102 executing the PCI system configuration software 102A over the PCI bus 110. Information written into these registers may configure the device resources such as input/output (I/O) address, memory address, and interrupt level of the network management card 200. The "PCI Local Bus Specification, Revision 2.1" sets forth a list of configuration registers needed in interfacing the network management card 200 to the PCI bus 110, and provides sufficient information to enable an ASIC designer to design a suitable PCI bus controller ASIC specifically for the network management card 200.

In addition, the PCI bus controller ASIC 210 may include custom-designed hardware arrangements to track events such as, for example, video mode transitions from a graphics controller 120C of the video subsystem 120 from text to graphics mode which may occur on the PCI bus 110, to store a record of those video mode transitions in register space (configuration registers), and to capture a screen image of a host system for transmission over a computer network to a remote user without any corruption of a screen image. The PCI bus controller ASIC 210 may also generate an interrupt output signal that is used to notify the local microprocessor 218 when a video mode transition on the PCI bus 110 is detected. Similar to the local memory 216 and the local network controller 220, the PCI bus controller ASIC 210 may also connect to the local microprocessor 218 through the address/data/control bus 220, so that the local microprocessor 218 is able to read and write to registers in the PCI bus controller ASIC 210.

Figure 3:
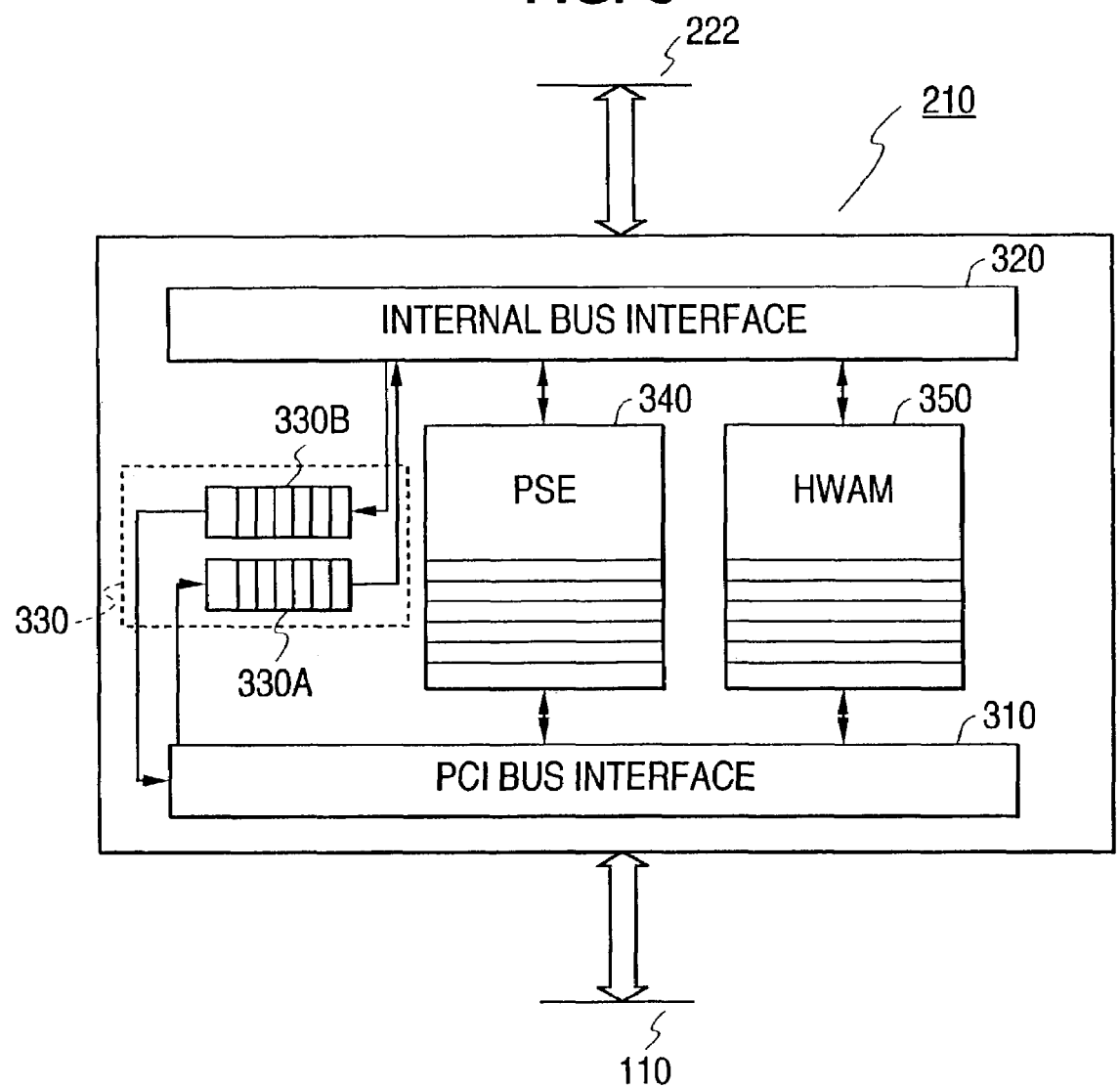
FIG. 3 illustrates an example block diagram of a PCI bus controller ASIC of the network management card as shown in FIG. 2.

Turning now to FIG. 3, a block diagram of parts of an example PCI bus controller ASIC 210 is provided for detecting video mode transitions from the graphics controller 120C of the video subsystem 120, and for capturing a screen image provided by the video subsystem 120 of the host system by reading frame buffer data (i.e., the screen image) from video memory 120A in a non or minimally corrupting fashion with the graphics controller 120C that was not designed for multi-master accesses. For example, the PCI bus controller ASIC 210 may include a PCI bus interface 310, an internal bus interface 320, a data buffer unit 330, Programmable Snoop Engines (PSEs) 340 and special purpose hardware, called Video Capture Hardware Assist Machine (HWAM) 350. The PCI bus interface 310 provides an interface to the PCI bus 110. Likewise, the internal bus interface 320 provides an interface to the internal bus 222. Connected between the PCI bus interface 310 and the internal bus interface 320 are the data buffer unit 330, the PSE 340 and the HWAM 350. The data buffer unit 330 includes a first first-in/first-out (FIFO) buffer 330A which moves data from the PCI bus interface 310 to the internal bus interface 320, and a second first-in/first-out (FIFO) buffer 330B which moves data in the opposite direction.

The Programmable Snoop Engines (PSEs) 340 may be configured and/or programmed to "snoop" all input/output (I/O) cycles passing through the PCI bus 110 for sensing any video mode transition of the graphics controller 120C in a video subsystem 120 from a text mode to one of many graphics modes (or vice versa) during, for example, a boot-up or reset operation. Generally, the video mode transition may occur when the host processor 102 issues a write request or a group of write requests to certain video addresses of video memory 120A. Since these write instructions pass through the PCI bus 110, the PSEs 340 may be set up by software running on the network management card 200 to sense such a video mode change by looking at the voltage levels on the PCI signal lines. After a specific video mode change occurs, the PSEs 340 may be reprogrammed to look for a different mode change. The PSEs 340 may also be extended in the direction of greater resources (more snoop engines) and greater programmability. For example, with two PSEs 340, either of two different mode changes, i.e., from text to graphics mode (or vice versa) can be sensed at any time. The mode change information may then be sent over a computer network to a remote user to inform the remote user of the progress of the host system during, for example, a boot-up or reset operation. While the primary intended use of the PSEs 340 may be to detect video (graphics) mode transitions, the PSEs 340 may also be used for other purposes such as, for example, to capture system POST (Power-On Self-Test) for transmission over a computer network to a remote system. The POST is a well known set of routines that tests the motherboard, memory, disk controllers, video subsystems, keyboard and other primary system components for purposes of troubleshooting system failures and/or problems. In addition, the PSEs 340 may also be extended to an arbitrarily complex device that watches a PCI bus 110 for a programmed type or sequence of operations and interrupt a local processor 218 upon completion of a specific task.

The Video Capture Hardware Assist Machine (HWAM) 350 may be configured and/or programmed to execute a sequence of operations to access the video memory 120A of the video subsystem 120 and to determine, in hardware, whether or not the sequence of operations was atomic (i.e., not interrupted by any other operations) and how many clocks on the PCI bus 110 were required to complete the sequence of operations. The primary intended use of the HWAM 350 may be to capture frame buffer data (i.e., a screen image) of a host system for transmission over a computer network or other communications link to a remote system. The hardware feature of the HWAM 350 may provide the software running on the network management card 200 a range of options in capturing frame buffer data (i.e., a screen image) of a host system for transmission over a computer network. During capturing of frame buffer data, it must be remembered that for typical video arrangements arranged (i.e., meant) to allow only one master to access the same, the video capture arrangement of embodiments of the present invention may represent a second device attempting to access the typical video arrangements. Thus, there may be a possibility of conflicts between the host system's operation and the present invention, and such possibility of conflicts should be taken into consideration during design and operation of embodiments of the present invention. For example, the first option may relate to a rapid access sequence (limited only by the speed of the PCI bus 110 and the graphics controller 120C of a video subsystem 120) which may guarantee that the probability of collisions between the network management card 200 and system graphics controller accesses may be minimized. The second option, atomic operation detection, may allow software running on the network management card 200 to evaluate the effectiveness of screen capture. The evaluation may be performed either at the time a screen image may be captured, or at the time a test image may be captured when the network management card 200 may first be installed in a host system. The evaluation information may then be used to alert a remote user on a computer network as to whether a captured screen image may be relied upon. The third option, counting clocks, may be intended to take advantage of characteristics of certain PCI bus arbiters usable in a PCI bus system. Some PCI bus arbiters may contain a feature that allows multiple back-to-back sequences to proceed uninterrupted as long as the sequence may be completed in less than a certain number of clocks. By giving software knowledge of the length of an access sequence, the PCI bus arbiter may evaluate, in a particular host system, whether or not this feature may be present and, if so, may set such a feature for optimal operation. Lastly, the fourth option may relate to locking of the PCI bus 110. Some PCI systems may support bus locks initiated by add-in cards, such as the network management card 200, and as a default, the network management card 200 may attempt to lock the PCI bus 110 during HWAM cycles. This last option may be turned off.

Both the Programmable Snoop Engines (PSEs) 340 and the Video Capture Hardware Assist Machine (HWAM) 350 of the PCI bus controller ASIC 210 may contain registers provided as user-definable from the "PCI Local Bus Specification, Revision 2.1." The two Programmable Snoop Engines (PSEs) 340 each may include a set of PSE registers (4 each, for 8 total registers). The register called "snoop value" may hold the latest value "snooped" or copied off the PCI bus 110 when an interesting I/O cycle passed through the PCI bus 110. Whether an I/O cycle is interesting or not may be determined by what is programmed into the other three registers.

Figure 4:
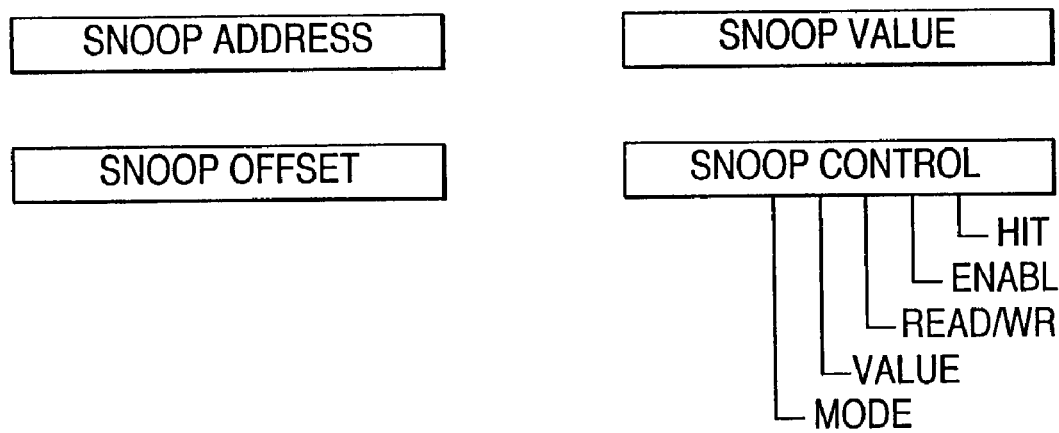
FIG. 4 illustrates an example of Programmable Snoop Engine (PSE) registers which may reside in a PCI bus controller ASIC according to the principles of the present invention.

For example, FIG. 4 illustrates a Programmable Snoop Engine (PSE) 340 including a set of PSE state registers which reside in a PCI bus controller ASIC 210 according to embodiments of the present invention. The PSE state registers may include a Snoop Control Register, a Snoop Address Register, a Snoop Offset Register, and a Snoop Value Register.

SNOOP CONTROL REGISTER may contain several bits, including a Snoop Hit bit, Snoop Enable (SNPENB) bit, a Snoop Read/Write (SNPRW) bit, a Snoop Value (SNPVAL) bit, a Snoop Mode (SNPMODE) bit that may be used to specify the type of snooping to be performed. When configuring the PSEs 340, the software running the network management card 200 may first disable snooping by clearing the SNPENB bit, then set up the address offset, and value registers, and then finally enable snooping by setting SNPENB bit in order to avoid inadvertent interrupts due to a partially configured state machine.

The Snoop Enable (SNPENB) bit may be used to enable snooping. When set, snooping may be enabled. When reset, snooping may be disabled.

The Snoop Read/Write (SNPRW) bit may be used to snoop for reads or writes. When set, the PSEs 340 may watch for reads to the address specified in the snoop configuration registers. When reset, the PSEs 340 may snoop for writes.

The Snoop Value (SNPVAL) bit may be used to snoop for a specific value. When reset, reads or writes to the specified address may trigger a video capture of a host system regardless of the value read or written. When set, the PSEs 340 may capture only reads or writes that contain the data specified in the snoop value register.

The Snoop Mode (SNPMODE) bit may toggle absolute/index mode. When reset, the address given in the snoop address register may be taken to be the address to snoop (the snoop offset register may be ignored). When set, the address in the snoop address register may be taken to be an index register and the snoop offset register may be employed.

SNOOP ADDRESS REGISTER may be used to specify the 16-bit address of either (1) the I/O port to snoop, or (2) the index register from an index/base register pair to snoop. The SNPMODE bit determines which of these meanings may be applicable. When SNPMODE bit is set, the PSEs 340 may match the address on the bus I/O cycle with the contents of this register to enable image capturing. When SNPMODE bit is reset, the PSEs 340 may enter a two-phase snoop sequence. In the first phase, the PSEs 340 may look for an I/O write cycle with an address matching this register, and with data matching the Snoop Offset register. When this match occurs, the PSEs 340 may enter the second phase, in which the PSEs 340 may look for either an I/O write or an I/O read (based on SNPRW) to the address which matches this register plus one, and may also look for a match on the data specified in the Snoop Value register if the SNPVAL bit is set. Not until this match occurs will a snoop hit be signaled. The PSEs 340 may remain in phase two until a match occurs or until the PSEs 340 is disabled. Note that in the case of a word access, both of these phases could occur during the same cycle.

SNOOP OFFSET REGISTER may be used to specify the 8-bit offset from the index register to snoop. If the SNP-MODE bit in the snoop control register is reset, this register may be ignored. Otherwise, the PSEs 340 may match the address on the bus I/O cycle with the contents of the snoop address register and also match the corresponding data byte with the contents of this register to enable the data capturing phase.

SNOOP VALUE REGISTER may be used to specify the 8-bit value to snoop. If the SNPVAL bit in the snoop control register is set when an I/O read/write occurs to the byte location specified by the snoop address and offset registers (data port) and the data written/read matches the value in this register, the local microprocessor 218 may be interrupted. If the SNPVAL bit in the snoop control register is reset, this register may be used as the destination to capture the image before the local microprocessor 218 may be interrupted.

The Video Capture Hardware Assist Machine (HWAM) 350 may be a programmable state machine that automatically executes the correct sequence of operations needed to access a particular frame buffer of video memory 120A in a video subsystem 120. The Video Capture Hardware Assist Machine (HWAM) 350 may contain two snoop engines implemented to work, for example, with graphics controller 120C operated in standard 640 pixel by 480 pixel by 16 colors VGA mode, and to keep track of certain graphics controller state items. The snoop engines may be fixed instead of programmable. In addition, the HWAM 350 may be configured to alert the local microprocessor 218 if a frame buffer access was not completed atomically (i.e., without interruption) and to keep track of the number of clock cycles needed to complete the operation.

Figure 5:
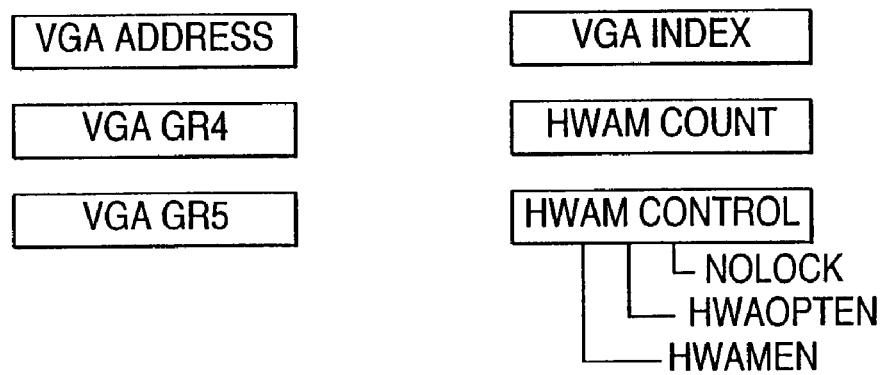
FIG. 5 illustrates an example of Video Capture Hardware Assist Machine (HWAM) registers which may reside in a PCI bus controller ASIC according to the principles of the present invention.

FIG. 5 illustrates an example Video Capture Hardware Assist Machine (HWAM) 350 including a set of example HWAM registers which reside in a PCI bus controller ASIC 210 according to the embodiments of the present invention. The Video Capture Hardware Assist Machine (HWAM) 350 may include a set of HWAM registers, including a VGA Address Register (VGAADDR), a VGA Graphics Register 4 (GR4), a VGA Graphics Register 5 (GR5), a VGA Graphics Control Index Register (GCIR), a Hardware Assist Count Register (HWACNT), and a Hardware Assist Control Register.

VGA ADDRESS REGISTER (VGAADR) may contain bits 15 to 2 of the VGA address at which the hardware-assist circuitry may automatically save and restore the VGA system latches, in the A00000h-AFFFFh region (not shown) of video memory 120A in a video subsystem 120. The hardware-assist circuitry may use the uppermost byte in the word which may be addressed through this register.

VGA GRAPHICS REGISTER 4 (GR4) may contain the latest snooped value of the VGA GR4 register which may point to one of four byte planes most recently accessed by the host system. The value in this register may be used by the HWAM 350 to restore the original GR4 value after an access to the VGA frame buffer of video memory 120C in a video subsystem 120.

VGA GRAPHICS REGISTER 5 (GR5) may contain the latest snooped value of the VGA GR5 register, containing the VGA mode control bits. The value in this register may be used by the HWAM 350 to restore the original GR5 value after an access to the VGA frame buffer of video memory 120C in a video subsystem 120.

VGA GRAPHICS CONTROL INDEX REGISTER (GCIR) may contain the latest value of the VGA Graphics Index register, located at I/O location 3CEh. The register may point to one of eight of the VGA graphics registers of a video subsystem 120. The value in this register may be loaded at the beginning of a frame buffer access sequence and may be used by the HWAM 350 to restore the original index value after an access to the VGA frame buffer.

HARDWARE ASSIST COUNTER REGISTER (HWACNT) may contain the upper 7 bits of an 8-bit counter (not shown) for counting the number of cycles the VGA frame buffer access sequence is consuming on the PCI bus 110 to complete. Upon reaching 0×FF, such a counter may set bit 0 and may wrap around. The counter may also be reset at the beginning of a frame buffer access sequence. The HWACNT may include a Hardware Assist Overflow (CNTOFLO) bit. When set, the CNTOFLO bit may indicate that the hardware-assist count register (HWACNT) has overflowed its 8-bit length and has counted more than 255 PCI cycles. The CNTOFLO bit may be reset at the beginning of a frame buffer access sequence.

HARDWARE ASSIST CONTROL REGISTER may contain several bits, including a PCI LOCK# Disable (NOLOCK) bit, a Hardware Assist Optimization Enable (HWAOPTEN) bit, and a Hardware Assist Enable (HWAEN) bit which may be used for controlling the HWAM of operations.

The PCI LOCK# Disable (NOLOCK) bit may be set to keep the HWAM 350 from driving the PCI LOCK# bit during the frame buffer access sequence to avoid conflicts with PCI implementations which may not allow bus locking.

The Hardware Assist Optimizing Enable (HWAOPTEN) bit may be set to enable optimization that in some cases may reduce the number of PCI cycles required to execute the frame buffer access sequence. When not set, the entire frame buffer access sequence may be executed each time the frame buffer is read.

The Hardware Assist Enable (HWAEN) bit may be used to enable the HWAM sequence of operations.

An example operation of a Video Capture Hardware Assist Machine (HWAM) 350 of a PCI bus controller ASIC 210 will now be described for capturing a screen image of a host system with the objective of minimizing or totally avoiding video corruption of the video system of the host system. The HWAM 350 of the PCI bus controller ASIC 210 may be a hardware module implemented to execute a sequence of operations to capture a screen image from a video memory 120A in a video subsystem 120. The entire sequence may include several basic instructions, including writing to local video registers 120B in a video subsystem 120, reading frame buffer data from a video memory 120A in a video subsystem 120, writing original values back to the video registers 120B, all in one indivisible (atomic) operation and all done as fast as the PCI bus 110 allows a sequence of clock cycles to run in a way that is transparent to the local microprocessor 218 of a network management card 200 and the host processor 102 of a host system. The frame buffer access sequence may be necessary because VGA and SVGA specifications may require correct setup of certain registers such as a read map select register GR4 and a mode register GR5 in a video subsystem 120. Otherwise, the act of reading video memory may inadvertently change other registers, known as system latches and graphics indexes, and may corrupt the video memory 120A in a video subsystem 120. Thus, in order to capture a screen image without causing any video corruption, the sequence of events may require the HWAM 350 of the PCI bus controller ASIC 210 to save the original values of GR4 and GR5, the graphics (VGA) indexes, and the system latches, to read the video memory 120A, and then to restore the VGA latches, the VGA indexes, and (GR4) and (GR5) back to previous conditions.

In particular, the sequence of operations performed by the HWAM 350 may be described as follows. First, it should be noted that the fixed snoop engines of the HWAM 350 may be configured to continuously snoop data information in VGA GR4 and GR5 registers of video registers 120B in a video subsystem 120. When the local microprocessor 218 of the network management card 200 requests VGA frame buffer data, the HWAM 350 may perform the following nine (9) steps:

1. Perform an I/O read of address 3CEh of video registers 120B in a video subsystem 120 to acquire the PCI bus 110. Abort the sequence if the PCI GRNT# (grant) protocol is not asserted at the end of this cycle.

2. Perform a 16-bit I/O write to address 3CEh to stuff GR4 (Read Map Select Register) with the plane from which data is to be read from a video subsystem 120 (if different from the current plane, otherwise skip this step).

3. Perform a 16-bit I/O write to address 3CEh to stuff GR5 (Mode Register) to select Read Mode 0 and Write Mode 1 in a video subsystem 120 (if already set, skip this step).

4. Write to the VGA address saved in the VGAADDR register of HWAM state registers. This automatically saves VGA system latches of a video subsystem 120.

5. Read data from the requested frame buffer address of video memory 120A in a video subsystem 120.

6. Read a byte from the VGA address saved in the VGAADDR register from HWAM state registers. This automatically restores the VGA system latches of video registers 120B in a video subsystem 120.

7. Perform a 16-bit I/O write to address 3CEh with the snooped value to restore GR5 if stuffed in step 3, otherwise skip this step.

8. Perform a 16-bit I/O write to address 3CEh with the snooped value to restore GR4 if stuffed in step 2, otherwise skip this step.

9. Perform an 8-bit I/O write to address 3CEh with the value read in step 2 to restore the previous index (only if altered by a previous step, otherwise skip this step).

This sequence of operations may have a number of conditional steps. These five (5) conditional steps may be performance-enhancing optimizations and may be performed if the HWAOPTEN bit is set. If these conditional steps may be skipped, the HWAM sequence of operations may be reduced from nine steps to four steps, and may be quickly executed in a few clocks on the PCI bus 110. The HWAM sequence of operations may guarantee non-corrupting access to video memory 120A in a video subsystem 120 as long as the steps are executed atomically (i.e., without interruptions), that is, without another agent (host processor 102) accessing the graphics controller 120C in a video subsystem 120 in the midst of the HWAM sequence of operations. Software from the local memory 216 running on the network management card 200 may contain mechanisms for evaluating and enhancing the effectiveness of video capture in a particular host system.

However, if a PCI arbiter (not shown) in a host system kicks the network management card 200 off the PCI bus 110 for any reasons and gives control of the PCI bus 110 to the host processor 102 of a host system before the HWAM sequence of operations is completed, then the screen image of a host system transmitted over a computer network to a remote user may get garbled or corrupted. Such operation of a PCI arbiter may be described in the "PCI Local Bus Specification, Revision 2.1." To ensure that the HWAM sequence of operations may be executed atomically (i.e., without interruptions), the network management card 200 needs to have an exclusive access to the PCI bus 110. There may be several techniques to ensure that the network management card 200 have an exclusive access to the PCI bus 110. For example, software running on the network management card 200 may be configured to change a programmable configuration register on the host system, known as a Minimum Transaction Timer (MTT) register which tells the PCI arbiter (not shown) what the minimum slice of time is to be given for the network management card 200 to have an effective bus lock for a certain number of clocks. A standard minimum time value given to the network management card 200 for an effective bus lock may be set for 64 clock cycles. Usually, an effective bus lock for 64 clock cycles may be sufficient to complete the HWAM sequence of operations. This is because the HWAM 350 may complete the entire sequence of operations in just a few clocks on the PCI bus 110, anywhere from around 15 to 60, for example. However, the minimum time value may be programmed to another value such as, for example, 128 clocks, in the unlikely event that 64 clocks may not be enough. In addition to the MTT register, the HWAM 350 may also be programmed to have an exclusive access to the PCI bus 110 by asserting PCI LOCK# in the manner described in accordance with the "PCI Local Bus Specification, Revision 2.1." The PCI LOCK# signal may inform the PCI arbiter (not shown) to allow the network management card 200 to keep control of the PCI bus 110 until the HWAM sequence of operations is completed.

Nevertheless, in the unlikely events that the host system may inadvertently ignore the PCI LOCK# request, that the host system may not contain a MTT register, and that the video memory 120A in a video subsystem 120 may be very slow, the HWAM sequence of operations may be interrupted from time to time, and the screen image on the host system may get garbled. A remote user may still check the Hardware Assist Counter Register (HWACNT) to note the time for executing the entire HWAM sequence of operations. As described with reference to FIG. 5, the HWACNT register may keep a count of how many clock cycles it took to complete the latest HWAM sequence. Second, the remote user may look in another register bit, called NONATM (non-atomic) (not shown), which may be set each time a HWAM sequence is interrupted. Based on how often this NONATM register bit may be set, the remote user may determine how garbled a screen image is likely to become, and whether or not it is worth operating the HWAM 350 to capture the screen image of a host system. Lastly, the remote user may always capture a screen image of a host system to gain clues as to the host system operation even if such a screen image may be "corrupted" or "static-filled."

In practice, however, neither the MTT register nor the PCI LOCK# asserted for an exclusive bus access may be needed because the HWAM 350 may always complete the entire sequence of operations in a few clocks on the PCI bus 110 without interruptions. Typically, the remote user may send a request over a computer network, asking for a byte or word (these are amounts of memory) of video memory 120A in a video subsystem 120. The local microprocessor 218 on the network management card 200 may take the request and may pass that request to the PCI bus controller ASIC 210 as a simple command to read video memory 120A. The PCI bus controller ASIC 210 may take that read command, and may perform the HWAM sequence of operations for purposes of capturing that one piece of video data and returning the same to the local microprocessor 218 for transmission over a computer network. There may be hundreds of these reads to build up a single screen image, but by running a series of these read requests, the remote user may continuously update his/her screen in real-time, making it appear to the remote user that the remote screen is a continuous copy of the host screen.

Figure 6B:
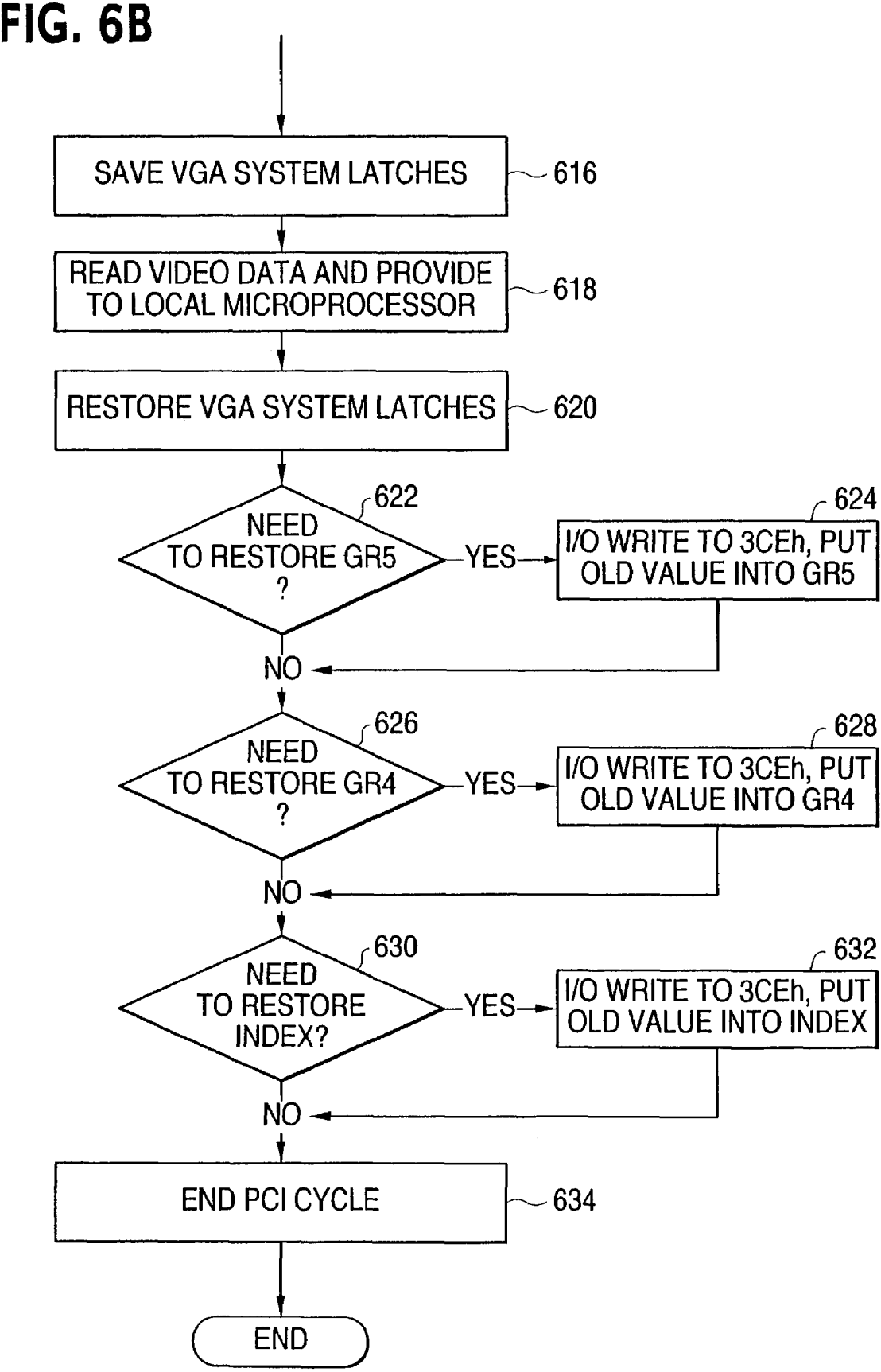

Referring now to FIGS. 6A and 6B, a flowchart of the HWAM sequence of operations is illustrated for capturing a screen image of a host system without causing video corruption according to the principles of the present invention. The HWAM sequence of operations may be described with reference to FIGS. 2 to 5 as follows. First, when a remote user sends a request over a computer network, asking for transmission of a particular byte or word (these are amounts of memory) from a video memory 120A in a video subsystem 120. The local microprocessor 218 of the network management card 200 may take the request and pass that request to the PCI bus controller ASIC 210 as a simple command to read the video memory 120A from a video subsystem 120. Upon receipt of such a request, the PSEs 340 may begin to "snoop" all I/O cycles passing through the PCI bus 110 for sensing any video mode transition from a graphics controller 120C in a video subsystem 120. Simultaneously, the HWAM 350 of the PCI bus controller ASIC 210 may begin the HWAM sequence at block 600. The HWAM 350 of the PCI bus controller ASIC 210 may then perform an I/O read of address 3CEh of video registers 120B in a video subsystem 120 to obtain the VGA index, and at the same time to acquire the PCI bus 110 at block 602.

Next, the HWAM 350 of the PCI bus controller ASIC 210 may determine whether a lock is enabled (i.e., NOLOCK turned off) at block 604. If the lock is enabled (i.e., NOLOCK turned off) at block 604, the HWAM 350 may proceed to determine whether a lock has been established at block 606. Whether the lock has been established may be determined by standard PCI handshake as described in accordance with the "PCI Local Bus Specification, Revision 2.1." If the lock is not enabled (i.e., NOLOCK turned on) at block 604, the HWAM 350 may bypass block 606 and proceed directly to determine whether there is a need to stuff the read map select register GR4 at block 608 and the mode register GR5 of video registers 120B in a video subsystem 120 at block 612. GR4 and GR5 registers are well-known registers in a video subsystem as described in accordance with VGA and SVGA specifications. To avoid causing any corruption of a screen image, the GR4 and GR5 registers may be set up correctly before video memory 120A can be read. If there is a need to stuff the GR4 and GR5 registers at blocks 608 and 612, the HWAM 350 may proceed to perform a 16-bit I/O write to 3CEh (address) of video registers 120B in a video subsystem 120 and put new values into the GR4 and GR5 indicating a part of a screen image to be transmitted to a remote user while the PSEs 340 may "snoop" the old values of GR4 and GR5 registers at blocks 610 and 614, respectively.

For purposes of illustration and simplicity, the GR4 and GR5 may be considered as X and Y coordinates of a screen image comprised of, for example, 10 different video locations. If a host processor 120A of a host system reads a certain location such as a video location #6 for a real-time display on a display monitor (not shown), and the remote user requests for a video location #3, then the GR4 and GR5 registers which contain old values for a video location #6 may be stuff with new values for a video location #3. These new values of GR4 and GR5 registers may be written at blocks 610 and 614. However, if the remote user requests for a video location #6 as the same video location read by the host processor 120A, then blocks 608 and 612 may be skipped to save time.

Afterwards, the HWAM 350 may save the VGA system latches of video registers 120B in a video subsystem 120 at block 616, read video data from a corresponding video location of a video memory 120A in a video subsystem 120 and provide the same to the local microprocessor 218 at block 618. After the video data from the corresponding video location of a video memory 120A may be provided to the local microprocessor 218 at block 618, the HWAM 350 may restore the VGA system latches of video registers 120B in a video subsystem 120 and begin to restore the GR4, GR5 and the index to their previous conditions before the end of a PCI cycle at blocks 622 to 634. More specifically, if the remote user requests for a video location #3, and the host processor 120A of a host system reads a video location #6, then the old values of GR4 and GR5 registers may be restored at blocks 624 and 628. Likewise, the old value of the index may also be restored at block 632. Again, if the remote user requests for a video location #6 as the same video location read by the host processor 120A, then blocks 622 to 632 may be skipped to save time. In summary, the HWAM 350 may be implemented to save the original values of GR4, GR5, the VGA index, and the system latches of video registers 120B, to read the video memory 120A, and then restore the system latches, the VGA index, and GR4 and GR5 to their previous conditions, all in one indivisible (atomic) operation to allow the remote user to capture a screen image of a host system without causing any corruption of a host screen image.

Figure 1:
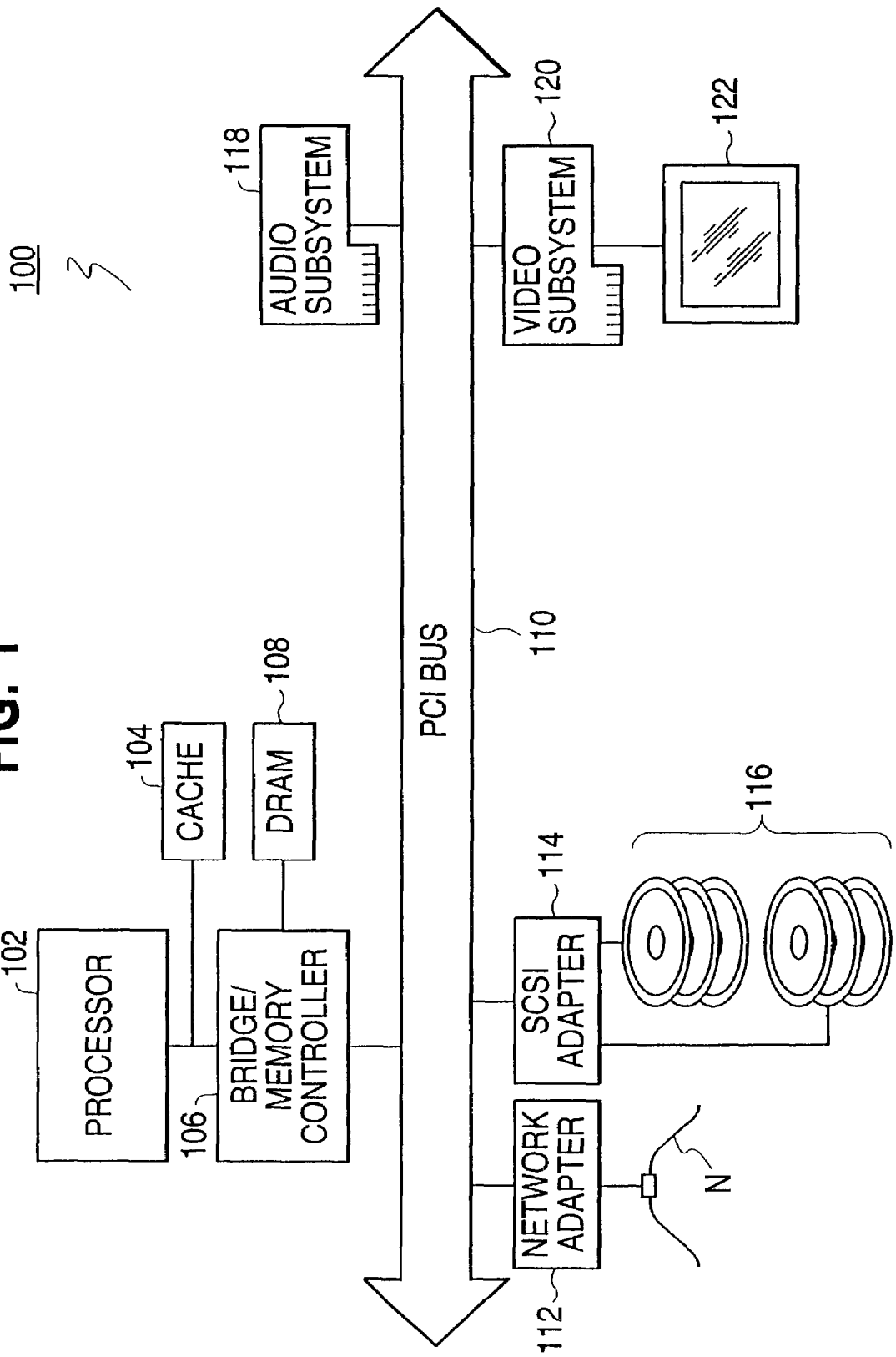
FIG. 1 illustrates an example host system having a standard system architecture.

FIG. 7 illustrates an example remote system management of a host system from a remote system over a computer network according to the principles of the present invention. A host system 20 may contain a network management card 200 plugged into a PCI slot (not shown) to evaluate operations of a PCI bus (not shown), including sensing a video mode transition from text to graphics mode (or vice versa) of a video subsystem, and to execute a HWAM sequence of operations to capture a screen image of a host system for transmission over a computer network. Depending on the implementation, software from the local memory 216 running on the network management card 200 may then signal remotely to a remote system 10 over a computer network 30, for example, that a mode transition from text to graphics mode or vice versa has occurred on the PCI bus (see FIGS. 1 and 2). In addition, such software may further communicate with a remote system 10 over a computer network as to what type of a screen image occurred, e.g., for analysis purposes and a proactive response, such as providing a host user or a remote user on a computer network an opportunity, for example, to view a host screen image from a remote system for remote diagnostics. For example, if the network management card 200 is installed in a host system (e.g., remote server) 20 on a computer network 30 such as a local area network (LAN), the network management card 200 may provide system diagnostics and real-time monitoring to assist a remote user (e.g., a LAN administrator) in proactively managing, repairing and enhancing the performance of the host system from a remote system (e.g., central server) over a computer network. Such system diagnostics may include important error messages which may be posted on a host system screen when the host system boots up, crashes and/or exceeds defined operating parameters so that a remote system (e.g., central server) may initiate corrective actions such as, for example, rebooting or resetting operation of a host system (e.g., remote server). As a result, server downtime may be minimized and the overall cost of server operations may be reduced. In addition, the network capability of network management card 200 may be designed to allow LAN administrators to manage and even reboot not only one server, but groups of remote servers with a single phone line, rather than a dedicated phone line for every managed server.

As described from the foregoing, the network management card according to the present invention has several advantages. First, the network management card provides a compact, cost effective addition to a host system that is fully enclosed in the host system, invisible to normal operations. Second, the network management card has its own clock and reset circuitry and power supply which provides immunity to global clock and global reset anomalies and allows tracking of any error and failure conditions, including video mode transitions which may occur at any time on the PCI bus, and capturing of a screen image of a host system. The network management card may report such error and failure conditions and such screen image to a local microprocessor for transmission over a computer network for remote viewing and remote system management. The network management card may provide an error message to a remote user and may allow the remote user an opportunity, for example, to monitor the health of a host system, to learn about failure conditions, and to recover from certain failures.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. For example, additional Programmable Snoop Engines (PSEs) may be provided to allow software to see what type of bus transaction interrupts a non-atomic sequence with the understanding that most interruptions would not access the video controller and would be of no consequence. More importantly, the PCI bus controller ASIC may be programmed with software in lieu of the Programmable Snoop Engines (PSEs) and the Video Capture Hardware Assist Machine (HWAM) to track operations of a PCI bus and to execute the entire sequence to capture video memory without causing any corruption of the screen image. Software may contain inherent overhead and may require extra clocks for reading and decoding the entire access sequence of operations. However, as computer technology develops in the near future, high-speed and low battery-powered microprocessors may be available for network management cards, such cost effective microprocessors may be used to implement the entire sequence of operations to capture a screen image for transmission over a computer network without overhead and without causing any corruption of the screen image. Further, the various operation of the PCI bus controller ASIC may instead be implemented via a suitably arranged/programmed processor. In addition, system buses may also include an Industry Standard Architecture (ISA) bus, an Extended Industry Standard Architecture (EISA) bus, and a Micro-Channel Architecture (MCA) bus. Many modifications may be made to adapt a particular situation to the teachings of the present invention without departing from the central scope thereof. Therefore, it is intended that the present invention not be limited to the various exemplary embodiments disclosed, but that the present invention includes all embodiments falling within the scope of the appended claims.

What is claimed is:

1. A mechanism for use in a host system having a video subsystem, comprising:
    a program to implement a video capture sequence of operations; and
    a bus controller controlled by said program, to track events on a bus of the host system, including operations of said video subsystem of the host system, and to execute said video capture sequence of operations initiated by said program to capture a screen image provided by said video subsystem of the host system for transmission to a remote system, via a communication link, for remote viewing and remote system management, wherein said video subsystem of the host system includes a video memory to retain graphics or character information for display, video registers including graphics indexes and system latches, and a graphics controller to control a visual display of said screen image, and wherein said bus corresponds to a Peripheral Component Interface (PCI) bus, and wherein said bus controller includes
    a PCI bus interface arranged to provide an interface to the PCI bus;
    an internal bus interface arranged to provide an interface to an internal bus;
    a data buffer unit arranged to transport video data between the PCI bus interface and the internal bus interface;
    Programable Snoop Engines (PSEs) programmed to snoop all input/output (I/O) cycles passing through the PCI bus to sense a video mode transition in the video subsystem between text and graphics modes; and
    a Video Capture Hardware Assist Machine (HWAM) arranged to execute said video capture sequence of operations to capture said screen image of the host system for transmission to the remote network over said communication link.

2. A mechanism as claimed in claim 1, wherein said bus controller reports occurrence of said events on the bus and said screen image captured from the host system to the remote system, via said communication link, for remote viewing and remote system management.

3. A mechanism as claimed in claim 1, further comprising:
    a local reset and clock generator which generates a local reset and a local clock that are separate and independent from a bus clock and a bus reset of the host system;
    a power supply source which provides said power supply;
    a memory which stores said program to implement said video capture sequence of operations, and an operating system that is separate and independent from the host system;
    a processor which processes said program and said operating system from the memory to implement said video capture sequence of operations; and
    a network controller which provides an interface to said communication link to communicate with said remote system over said communication link.

4. A mechanism as claimed in claim 3, wherein said host system is a host server on said communication link, and wherein said processor controls said network controller to transmit information indicating a video mode transition occurred on the bus from text to graphics mode and video data indicating said screen image to the remote system over said communication link for remote system management.

5. A mechanism as claimed in claim 1, wherein said Video Capture Hardware Assist Machine (HWAM) includes
    a plurality fixed snoop engines arranged to track activities of selected video registers of said video subsystem; and
    an assist machine arranged to execute said video capture sequence of operations to capture said screen image of the host system for transmission over said communication link.

6. A mechanism as claimed in claim 5, wherein said assist machine executes said video capture sequence of operations atomically to capture each designated section of said screen image by:

saving original values of selected video registers, graphics indexes and system latches of said video subsystem corresponding to each designated section of said screen image;

reading video data of said designated section of said screen image from the video memory of said video subsystem; and restoring the original values of said selected video registers and corresponding graphics indexes and system latches of said video subsystem.

7. A card for use in a host system, comprising:

a local reset and clock generator to generate a local reset and a local clock that is separate and independent from a bus clock of the host system;

a memory to store configuration information, a program to implement a video capture sequence of operations, and an operating system that is separate and independent from the host system;

a processor to process said configuration information, said operating system, and said program to implement said video capture sequence of operations from said memory;

a network controller to provide an interface to a computer network to communicate with a remote system over said computer network; and a bus controller operatively connected to said local reset and clock generator, said processor, and said network controller, to track events on a bus, including operations of a video subsystem of the host system, and to implement said video capture sequence of operations so as to capture a screen image provided by said video subsystem of the host system to communicate via said network controller to a remote system over said computer network for remote system management, wherein said bus includes a Peripheral Component Interface (PCI) bus, and said events on the bus include a video mode change of said video subsystem of the host system between a text mode and one of graphics modes, and said video subsystem of the host system includes a video memory to retain graphics or character information for display, video registers including graphics indexes and system latches, and a graphics controller to control a visual display of said screen image, wherein said bus controller includes a PCI bus interface arranged to provide an interface to the PCI bus;

an internal bus interface arranged to provide an interface to an internal bus;

a data buffer unit arranged to transport video between the PCI bus interface and the internal bus interface;

Programmable Snoop Engines (PSEs) programed to snoop all input/output (I/O) cycles passing through the PCI bus to sense a video mode transition in the video subsystem between text and graphics mode; and a Video Capture Hardware Assist Machine (HWAM) arranged to automatically execute said video capture sequence of operations to capture said screen image of the host system to transmit over said computer network to the remote system.

8. A card as claimed in claim 7, wherein said Video Capture Hardware Assist Machine (HWAM) includes a plurality of fixed snoop engines arranged to track activities of selected video registers of the video subsystem; and an assist machine programmed to automatically execute said video capture sequence of operations to capture said screen image of the host system to transmit over said computer network.

9. A card as claimed in claim 8, wherein said assist machine atomically executes said video capture sequence of operations to capture each designated section of said screen image by:

saving original values of selected video registers, graphics indexes and system latches of said video subsystem corresponding to each designated section of said screen image;

reading video data of said designated section of said screen image from the video memory of said video subsystem; and restoring the original values of said selected video registers and corresponding graphics indexes and system latches of said video subsystem.

10. A card as claimed in claim 9, wherein said host system is a host server on said computer network, and wherein said processor controls said network controller to transmit information indicating a video mode transition occurred on the PCI bus from text to graphics mode and video data indicating said screen image over said computer network to the remote system for remote system management.

11. A process comprising:

receiving a request from a remote system over a communication link to capture a screen image of a host system having a video system;

tracking events on a bus of the host system; and executing by a bus controller a video capture sequence of operations to capture a screen image provided by the video subsystem of the host system to transmit to the remote system over the communication link, wherein the bus includes a Peripheral Component Interface (PCI) bus, and wherein the video subsystem of the host system includes a video memory to retain graphics or character information for display, video registers including graphics indexes and system latches, and a graphics controller to control a visual display of the screen image, and wherein the video capture sequence of operations is atomically captured to capture each designated section of the screen image by:

saving original values of selected video registers, graphics indexes and system latches of the video subsystem corresponding to each designated section of the screen image;

reading video data of the designated section of the screen image from the video memory of the video subsystem; and restoring the original values of selected video registers and corresponding graphics indexes and system latches of the video subsystem.

12. A process as claimed in claim 11, wherein the screen image provided by the video subsystem of the host system is captured and transmitted to the remote system over the communication link for remote viewing and remote system management.

* * * * *